United States Patent [19]

Hazenbroek

[11] Patent Number: 5,069,652
[45] Date of Patent: Dec. 3, 1991

[54] KEEL BONE CUTTER

[76] Inventor: Jacobus E. Hazenbroek, Burg de Zeeuwstraat 52, Numansdorp, Netherlands

[21] Appl. No.: 612,553

[22] Filed: Nov. 13, 1990

Related U.S. Application Data

[63] Continuation-in-part of Ser. No. 605,542, Oct. 29, 1990.

[51] Int. Cl.$^5$ .............................................. A22C 21/00
[52] U.S. Cl. ...................................... 452/165; 452/166
[58] Field of Search ............... 452/165, 166, 160, 167, 452/149, 135

[56] References Cited

U.S. PATENT DOCUMENTS

| | | | |
|---|---|---|---|
| 3,483,591 | 12/1969 | Segur et al. | 452/165 |
| 3,624,863 | 12/1971 | Gasbarro | 452/165 |
| 4,382,314 | 5/1983 | Graham | 17/11 |
| 4,558,940 | 12/1985 | Hazenbroek et al. | 452/166 |
| 4,559,672 | 12/1985 | Hazenbroek et al. | 17/165 |
| 4,574,429 | 3/1986 | Hazenbroek | 17/165 |
| 4,581,789 | 4/1986 | Meyn | 452/165 |
| 4,841,602 | 6/1989 | van der Hoorn et al. | 17/23 |

Primary Examiner—Willis Little
Attorney, Agent, or Firm—Hopkins & Thomas

[57] ABSTRACT

The present invention comprises a method and apparatus for automatically separating the breast from the neck, shoulders, back and saddle of birds while the birds are moving along as overhead conveyor line (12). A mandrel (61) is inserted into the visceral cavity of each bird to rigidly support each bird, and causes the breast of each bird to protrude outwardly. A tiltable holding plate (76) is pivoted upwardly as the mandrel (61) is fully inserted into each bird, and engages the neck of each bird in a clamping relationship with the mandrel (61) to thereby hold each bird in place during cutting function. The birds are carried into engagement with a first rotary disk cutter (94) which cuts in to the birds between the breast and neck of each bird to separate the breast form the neck, shoulders and upper back of each bird. A second rotary disk cutter (99), positioned downstream from the first rotary disk cutter (94), engages the birds between the breast and saddle and lower back of each bird, completing the removal of the breast of the birds.

24 Claims, 3 Drawing Sheets

KEEL BONE CUTTER

CROSS REFERENCE

This is a continuation-in-part of U.S. Pat. application Ser. No. 605,542, filed Oct. 29, 1990.

FIELD OF THE INVENTION

The present invention relates in general a system for cutting apart previously eviscerated birds, such as chickens or turkeys. More particularly, the present invention relates to a method and apparatus for automatically removing the breast portions from the carcasses of previously eviscerated birds as the birds are suspended by their legs and moved in series along an overhead conveyor system.

BACKGROUND OF THE INVENTION

In the processing of chickens, turkeys and other types of birds through a poultry processing plant for defeathering, evisceration, cut-up and packaging for delivery to a retail grocery store, etc., it is highly desirable to perform as many of the processing steps as possible with automated machinery. It is important to minimize the amount of manual handling of the birds so as to minimize the expense of processing and to uniformly cut apart the birds.

The general trend in poultry processing in recent years has been to suspend birds by their legs from an overhead conveyor system and perform as many of the processing steps as possible as the birds are being moved in series on the conveyor system from one processing station to the next. For example, the birds can be decapitated, opened and eviscerated while being progressively advanced along an overhead conveyor system. Additionally, it is desireable to cut apart the birds while they move on an overhead conveyor system to avoid the manual handling of the birds while the cutting functions are being performed. A cut up system of this type is disclosed in my prior U.S. Pat. No. 4,574,429. However, it is still common practice to first remove the birds from the overhead conveyor system prior to cutting them apart.

One of the problems with the prior art poultry cut up machines of the type that cut the birds while the birds are suspended from an overhead conveying system is that it is difficult to accurately position and maintain the birds in alignment with the cutting elements of the cut up machine so that proper cuts are formed in the carcasses. When birds of different sizes enter the machine, the larger or smaller birds tend to approach the cutting elements at positions that are too low or too high for the cutting elements.

Some prior art processing systems have been developed that use mandrels to support the birds during the cutting steps. A cut up system of this type is disclosed in my prior U.S. Pat. No. 4,559,672. The birds are each positioned with their previously eviscerated visceral cavities mounted on a mandrel. This supports the carcass at a predetermined position without regard to the lengths of the legs of the birds, and the mandrels tend to expand the skeletal elements of the bird to a shape corresponding to the mandrel. However, most of the poultry cut up machines that use mandrels require the birds to be mounted by hand on the mandrels.

Therefore, it can be seen that it would be desirable to provide an improved, reliable and accurate method and apparatus for removing the breast portions of previously eviscerated birds as the birds are moved in series along on overhead conveyor system.

SUMMARY OF THE INVENTION

Briefly described, the present invention comprises a method and apparatus for removing the breast portions of previously eviscerated birds as the birds are moved in series suspended from an overhead conveyor line. The breast removal apparatus is mounted in a poultry processing line along the path of movement of the birds, so that the breast removal function can be performed in series with other poultry processing steps.

The breast removal apparatus includes a plurality of mandrels mounted upon a revolving support frame and a cam system which moves the mandrels downwardly into and upwardly out of the visceral cavity of the birds as the mandrels are revolved in response to the movement of the overhead conveyor system. As the mandrels are inserted into the visceral cavities of the birds, the mandrels tend to fill out the visceral cavities, causing the breasts of the birds to protrude outwardly from the mandrels.

A tiltable holding plate revolves with each mandrel and is tilted upwardly into engagement with the birds in response to the mandrel reaching its lowermost position in the visceral cavity of the birds. The tiltable holding plate has a protrusion at one end which engages adjacent the neck opening of the bird as the tiltable holding plate swings upwardly into engagement with the bird. The holding plate protrusion engages the neck opening of the bird in a clamping relationship with the mandrel so as to positively grip the neck and breast portion of the birds. This clamping action stabilizes the neck and shoulders of the bird and functions to help hold the bird in place during the cutting function. Also, the holding plate requires the carcass of the bird to be positioned at the desired elevation on the mandrel so that the bird is at the correct elevation for the subsequent cutting steps, and the holding plate stops the downward movement of the bird as the mandrel approaches its lowermost position so that the mandrel becomes fully inserted in the visceral cavity of the bird and urges the visceral cavity outwardly to a fully expanded configuration.

A stationary cutting blade is positioned along the path of movement of the birds as the birds are revolved about the revolving support frame. As the birds are revolved, they are passed into engagement with the stationary cutting blade. The stationary cutting blade forms guide incisions in the birds between the saddle and breast of each of the birds.

A first rotary disk cutter is positioned adjacent the revolving support frame along the path of movement of the birds. The first rotary disk cutter is oriented so as to cut upwardly into each bird between the breast, neck and shoulders of each bird to thereby separate the breast from the neck, shoulders and upper back of each bird. A second rotary disk cutter is mounted downstream from the first rotary disk cutter, and is oriented to cut into each bird between the breast and saddle of each bird. The second rotary disk cutter engages each bird at the guide incision previously made in each bird by the stationary cutting blade. The second disk cutter separates the breast from the saddle and lower back of each bird to thus complete the removal of the breast from each bird.

After the breast has been cut away from each bird, the cam system moves each mandrel upwardly and out of the visceral cavity of its bird and the tiltable holding plate is tilted downwardly away from the mandrel. A removal bar is mounted to the revolving support frame immediately adjacent each mandrel. As the mandrels are raised, the tail of each bird engages a removal bar and the birds are urged off of the mandrels, clearing the mandrels for continued operation and releasing the birds for further movement with the conveyor system.

Therefore, it is an object of this invention to provide an improved method and apparatus for automatically separating the breasts from the saddles, backs, necks and shoulders of birds while the birds are being transported in suspended series along a poultry processing line.

Another object of this invention is to provide an improved method and apparatus for aligning birds suspended from an overhead conveyor with cutting elements of a poultry cut up system and reliably and accurately removing the breast from the saddle, back, neck and shoulders of a bird moving along the overhead conveyor system.

Another object of this invention is to provide an improved method and apparatus for reducing the manual handling steps required in the process of subdividing and separating the parts of poultry in a poultry processing plant.

Other objects, features and advantages of the present invention will become apparent upon reading the following detailed description when taken in conjunction with the accompanying drawings.

DESCRIPTION OF THE PREFERRED EMBODIMENT

Figure 1:
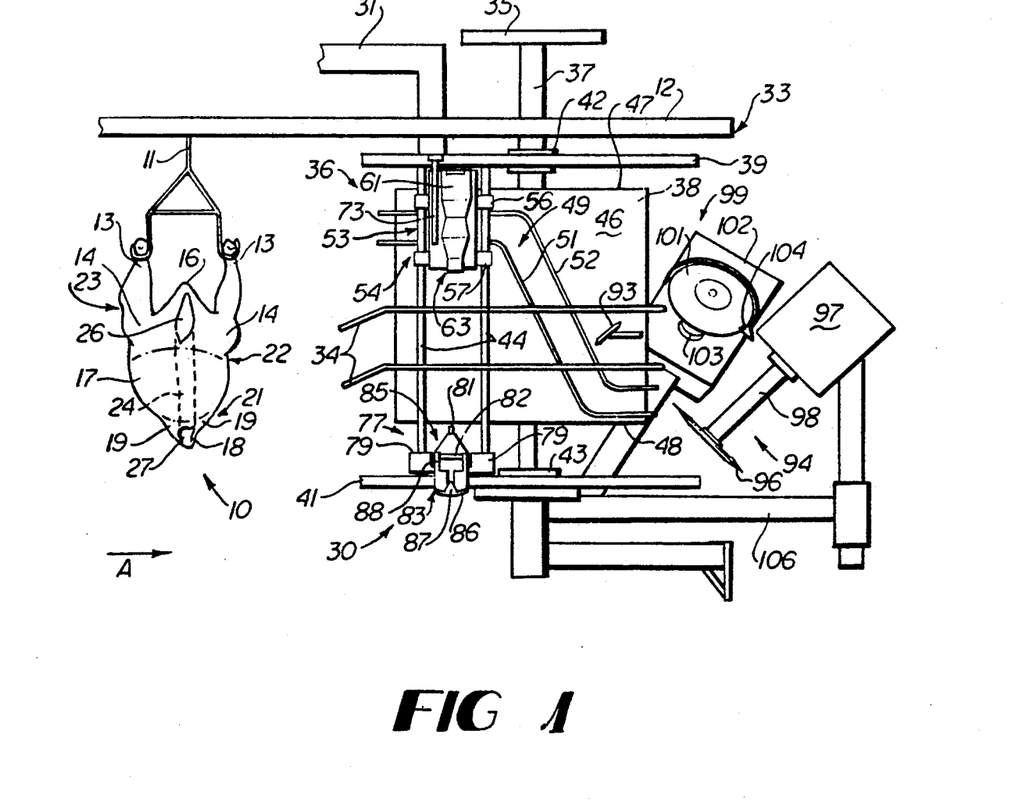
FIG. 1 is a side elevational view of the breast removal apparatus with only one removal module shown mounted thereon for clarity.

Referring now in greater detail to the drawings in which like numerals indicate parts throughout the several views, FIG. 1 illustrates a bird 10 suspended from a shackle 11 of a conventional overhead conveyor system 12. The bird 10 includes legs 13, thighs 14, tail 16, breast 17, neck 18, shoulders 19, an upper back 21, and a lower back 22. The legs 13, thighs 14, tail 16 and lower back 22 comprise the saddle portion 23 of the bird 10. The bird 10 includes a visceral cavity 24 (shown in dashed lines) which extends from a visceral opening 26 at the tail 16 of the bird through the bird to a neck opening 27 at the neck 18 of the bird.

As illustrated in FIG. 1 the bird 10 is carried by the overhead conveyor system 12 in the direction of Arrow A with the bird 10 hanging by its legs with its breast 17 facing downwardly. The wings (not shown) of the bird 10 typically have been removed prior to the engagement of the bird by the breast removal apparatus 30. However, the breast removal apparatus will function as described hereinafter with the wings still attached to the carcasses, if desired.

Figure 2:
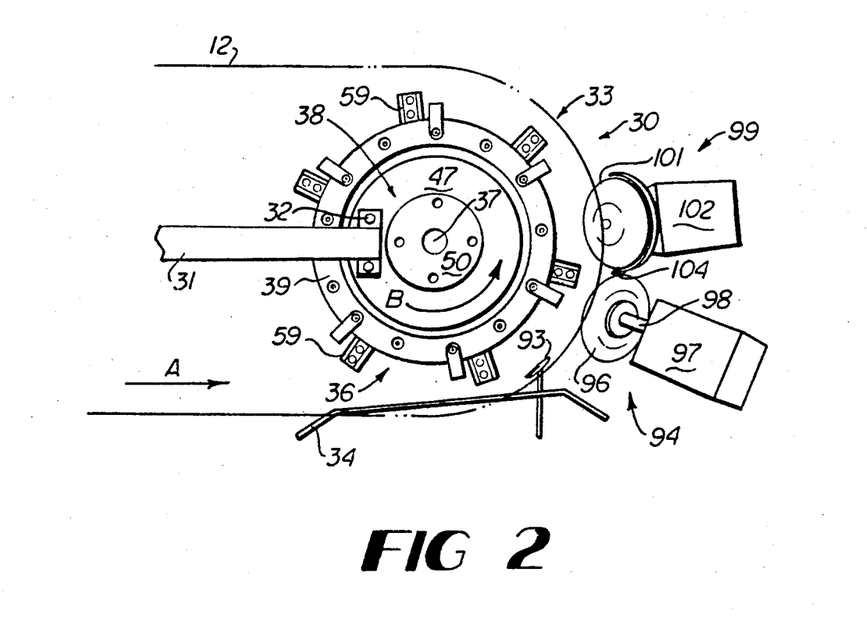
FIG. 2 is a plan view of the breast removal apparatus mounted along a poultry processing line.

As shown in FIG. 2, the breast removal apparatus 30 includes a revolving support frame or carrousel frame 36 mounted about a cam drum 38 which can be mounted on the floor of the processing plant in a stand alone arrangement; however, in the embodiment disclosed herein, the breast removal apparatus is mounted to a larger cut up apparatus, not shown, so that the breast removal apparatus functions in series with other processing devices on a common supporting framework. The upper portion of cam drum 38 is supported in a stationary position by a mounting bracket 31 which is attached to the supporting framework (not shown) and a lower horizontal support arm 28 supports the carrousel frame 36 from the supporting framework. The periphery of the carrousel frame 36 is aligned with the overhead conveyor system with the path of the birds hanging from the overhead conveyor system 12 extending around the breast removal apparatus 30 and the motion of the overhead conveyor system rotates the carrousel frame 36 of the breast removal apparatus.

As illustrated in FIGS. 1 and 2, a pair of parallel guide rods 34 are positioned adjacent the breast removal apparatus 30. The guide rods 34 are aligned with the direction of movement of the birds 10 (FIG. 1), and are initially slanted inwardly toward the breast removal apparatus 30 so as to guide the birds toward the breast removal apparatus. The guide rods 34 extend horizontally along the direction of movement of the birds 10, and stabilize and guide the birds into position for engagement by the breast removal apparatus as the birds 10 slide along the length of the guide rods 34.

The revolving carrousel frame 36 has an upright rotatable support shaft 37 and the stationary cam drum 38 is mounted in a stationary position about the support shaft 37. The support shaft 37 is attached at its upper end to a mounting plate 36 which is attached to a turning wheel (not shown) that rotates the support shaft and the carousel frame 36. Upper and lower rotary platforms 39 and 41 are mounted on support shaft 37. The upper and lower rotary platforms 39 and 41 are connected to one another by pairs of vertical guide bars 44 (only one pair of which is shown for clarity) evenly spaced about the carrousel frame 36.

Figure 3:
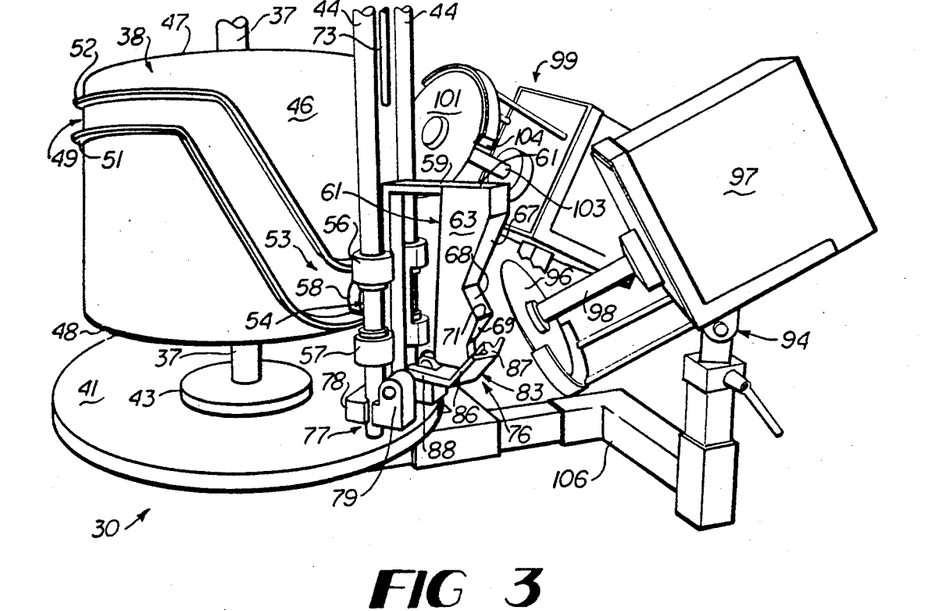
FIG. 3 is a perspective illustration of the breast removal apparatus illustrating the orientation of the rotary disk cutters in relation to the mandrel, with only one mandrel shown for clarity.

As shown in FIGS. 1 and 3, the cam drum 38 has a cylindrical side wall 46, an upper surface 47 and a lower surface 48. A cam system including a spiral cam track 49 having a pair of parallel cam surfaces 51 and 52 is formed about the cylindrical side wall 46. The cam track encircles the cam drum 38 in a substantially spiral path. A breast removal module 53 (only one of which is shown for clarity) is attached to each of the pairs of vertical guide bars 44 and are raised and lowered by the spiral cam track 49 as the modules 53 are revolved by the rotary platforms 39 by the support shaft 37 around cam drum 38.

Each breast removal module 53 includes a carriage 54 (FIG. 3) having upper and lower pairs of guides 56 and 57 each of which includes a bronze bushing 55 which is slidably mounted on a vertical guide bar 44 and enable the carriage to slide vertically along the guide bars 44. A cam roller 58 is affixed to the rear of the carriage 54 and engages the cam surfaces 51 and 52 of the spiral cam track 49. The cam roller 58 rolls along the cam surfaces 51 and 52 of the spiral cam track 49 as the rotary platforms 39 and 41 revolve with support shaft 37, around cam drum 38 causing the carriage 54 of the breast removal module 53 to move vertically along the guide bars 44. An L-shaped support arm 59 is affixed to the carriage 54 and thus moves vertically with the carriage 54. A mandrel 61 is attached at its upper surface to the L-shaped support arm 59 and is supported by the L-shaped support arm 59, spaced outwardly and apart from the carriage 54.

Figure 4A:
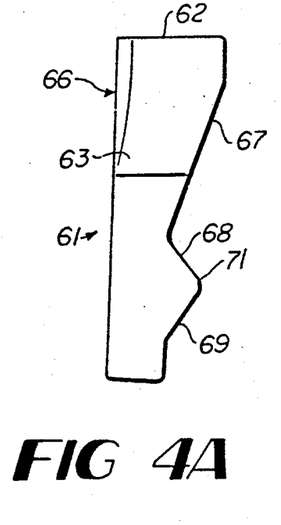
FIG. 4A is a side elevational view of a mandrel.
Figure 4B:
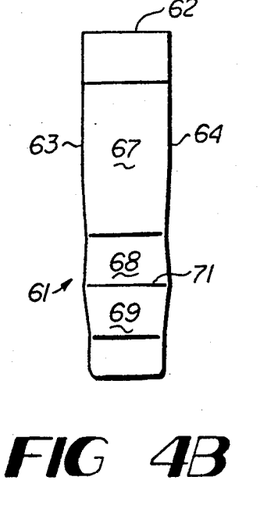
FIG. 4B is a front elevational view of a mandrel.
Figure 4C:
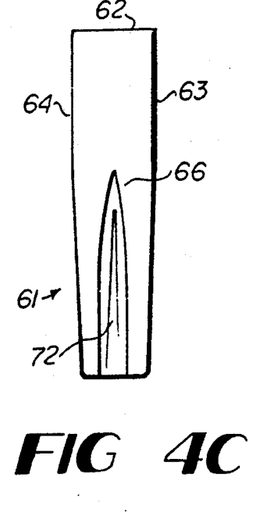
FIG. 4C is a rear elevational view of a mandrel.

As shown in FIGS. 4A–4C, the mandrel 61 has an elongated body, preferably formed from a rigid fiberglass or plastic material, and has substantially flat upper, side and rear surfaces 62, 63, 64 and 66. As shown in FIG. 4A, the mandrel has slanted front surfaces 67, 68 and 69 and tapers toward the bottom. A projection 71 is formed by the meeting of slanted front surfaces 68 and 69. As shown in FIG. 4C, a vertically oriented slot 72 is formed in the rear surface 66 of the mandrel 61 which slidably receives the lower and upper backbone 22 and 21 of a bird 10 (FIG. 5) as the mandrel enters the visceral opening 26 of the bird. The construction of the mandrel 61 enables it to be easily inserted into the visceral cavity 24 of a bird. The mandrel 61 fills out the bird as it engages the visceral cavity 24, causing the breast 17 of the bird to protrude outwardly and provides a rigid support for the bird during the removal of the breast 17 of the bird.

Figure 5:
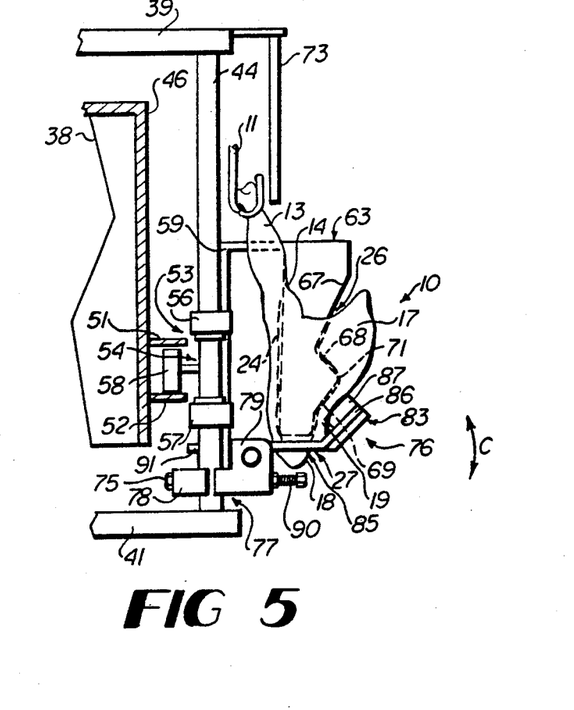
FIG. 5 is a side elevational view showing the insertion of the mandrel into the visceral cavity of the bird and the tiltable holding plate engaging the neck of the bird in a clamping relationship with the mandrel.

As shown in FIG. 5, a removal bar 73 is affixed to the upper rotary platform 39 adjacent side surface 63 of the mandrel 61. The removal bar 73 is a rod of a length slightly longer than that of the mandrel 61, and extends downwardly, parallel to side surface 63 of the mandrel. The removal bar 73 functions as a means for urging the bird of a bird 10 off of the mandrel 61 and away from the removal module 53 once the breast 17 of the bird has been removed.

Figure 6:
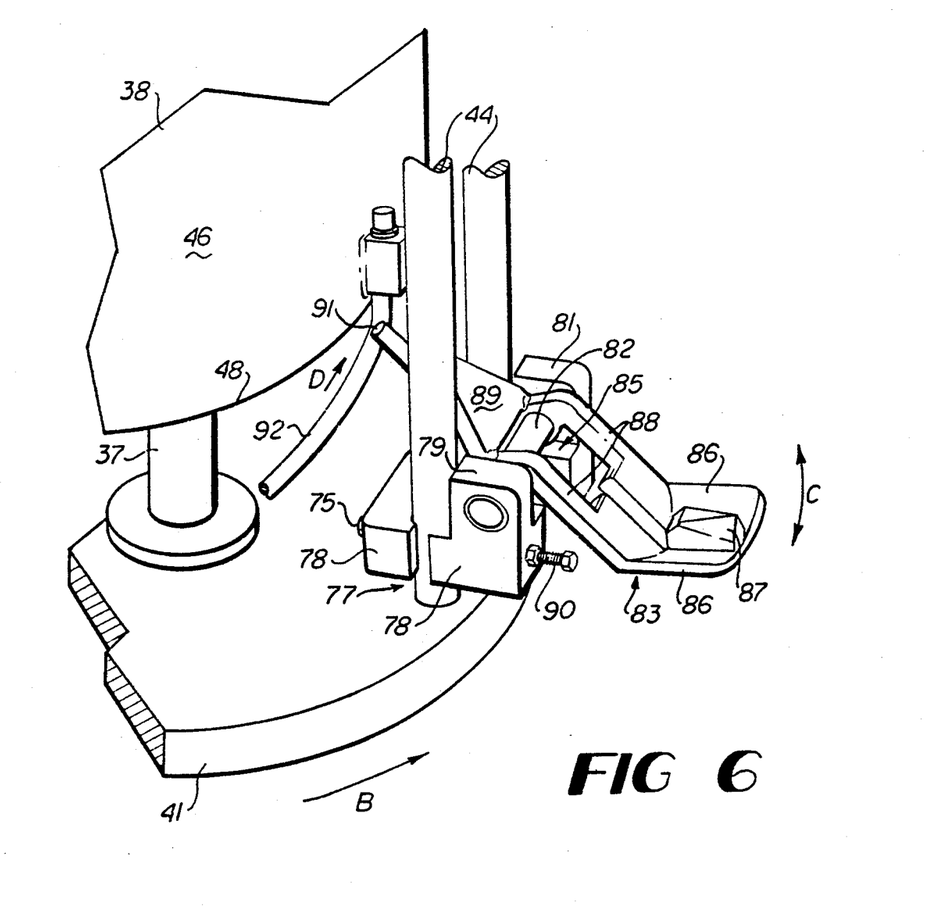
FIG. 6 is a perspective illustration of one of the tiltable holding plates.

A tiltable holding plate 76 is pivotably attached to a support block 77 (FIGS. 5 and 6) which is slidably mounted on the guide bars 44 between the lower ends of the guide bars adjacent the lower rotary platform 41 (FIG. 1). As shown in FIG. 6, the support block 77 has a lower rectangular base plate 78, and a pair of tabs 79 and 81 which extend upwardly, perpendicular to the base plate. An adjustment screw 75 is provided on the inwardly facing side surface of the base plate 78 and functions to secure the support block 77, and hence the tiltable holding plate 76, in a fixed position along the length of the guide rods 44. Thus, the position of the support block and the tiltable holding plate 76 can be adjusted vertically and set at a fixed position to accommodate birds of various sizes. An axle 82 is fixably attached to the tabs 79 and 81 and spans the region between the tabs. The axle 82 pivotably supports the tiltable holding plate 76, enabling the tiltable holding plate to swing in the direction Arrow C.

The tiltable holding plate 76 includes an outwardly extending W-shaped front plate 83 which has a pair of upwardly curved side portions 86 and a substantially rectangular wishbone engagement protrusion 87 mounted on top of the front plate 83, between the side portions 86. The wishbone engagement protrusion 87 is constructed such that its shape corresponds to the skeletal protrusions of the wishbone of the bird and mates with the slanted front surface 69 (FIG. 4B) of the mandrel 61. As shown in FIG. 5, the projection 71 tends to locate and engage the wishbone of the bird 10.

The tiltable holding plate 76 includes a pair of spaced apart arms 88 (FIG. 6) that extend inwardly from the front plate 83 of the tiltable holding plate 76, toward the cam drum 38 and encircle the axle 82 so as to pivotably mount the holding plate to the axle. As shown in FIGS. 5 and 6, an open space 85 is provided between the arms 88 through which the neck 18 of the bird 10 is extended as the mandrel 61 engages the visceral cavity 24 of the bird. The curved side portions 86 and the arms 88 extend beneath the shoulders of the bird and stop the downward movement of the bird as the mandrel approaches its lowermost position, thereby assuring that the bird is located at the proper elevation and that the mandrel is fully inserted in the visceral cavity of the bird and fully expands the visceral cavity to a shape that corresponds to the shape of the mandrel.

A triangularly shaped contact plate 89 (FIG. 6) is affixed to the arms 88 and is positioned directly below the lower end of the L-shaped support arm 59 (FIG. 3) for the mandrel 61. As the mandrel 61 is lowered into engagement with the visceral cavity 24 (FIG. 5) of a bird 10, the lower end of the L-shaped support arm 59 engages the contact plate 89 (FIG. 5), urging it downwardly and causing the front portion 83 of the tiltable holding plate 76 to swing upwardly so that the wishbone engagement protrusion 87 (FIG. 5) applies pressure at the neck opening 27 of the bird and engages the wishbone of the bird in a clamping relationship with the slanted front surface 69 of the mandrel 61 to stabilize the bird for cutting, with the curved portion 86 and the arms 88 of the tiltable holding plate supporting the shoulders 19 of the bird.

An adjustable stop 90 is attached to the front surface of the base plate 78 of the support plate 77 for the tiltable holding plate 76 and extends outwardly from the base plate 70. The adjustable stop 90 restricts the pivoting motion of the tiltable holding plate 76, preventing the tiltable holding plate from pivoting too far when it is not being engaged by the L-shaped support plates of the mandrel 61 and becoming misaligned such that it will not be in the proper position to engage and hold the neck of the bird to stabilize the bird during cutting.

As shown in FIG. 6, a rod 91 protrudes inwardly from the rear portion of the contact plate 89. The rod 91 engages an upwardly spiraling guide bar 92 which is mounted to the cam drum 38. The guide bar 92 extends from below the surface of rod 91 to just above the lower surface 48 of the cam drum 38. The rod 91 engages the guide bar 92 and is urged upwardly in the direction of Arrow D as the rod slides along the length of the guide bar, pivoting the tiltable holding plate 76 downwardly.

As illustrated in FIGS. 1 and 2, a stationary cutting blade 93 is mounted between the parallel guide rods 34 positioned to one side of the cam drum 38. The stationary cutting blade 93 is mounted in a position to cut into the bird 10 (FIG. 1) between the saddle 23 and the breast 17 of the bird.

As shown in FIGS. 1, 2 and 3, a first rotary disk cutter 94 is positioned adjacent one side of the cam drum 38, downstream from the stationary cutting blade 93. The first rotary disk cutter 94 includes a cutting blade 96 which is oriented at an angle, substantially parallel to front surface 68 (FIG. 3) of the mandrel 61. The cutting blade 96 is connected to a drive motor 97 by a drive shaft 98. The drive motor 97 positioned adjacent the breast removal apparatus 30 and rotates the drive shaft 98, causing the rotation of the cutting blade 96.

A second rotary disk cutter 99 is positioned adjacent and downstream from the first rotary disk cutter 94. The second rotary disk cutter includes a cutting blade 101 which is oriented at an angle approximately parallel to front surface 67 of the mandrel 61. The cutting blade 101 is connected to a drive motor 102 by a drive shaft 103 (FIGS. 1 and 3). The drive motor 102 is positioned below the cutting blade 101, adjacent the breast removal apparatus 30, and rotates the drive shaft 103 which in turn rotates the cutting blade 101. A guide finger or tab 104 (FIGS. 1 and 2) protrudes away from one side of the cutting blade 101, and helps guide the cutting blade 101 through the guide incision formed in the bird 10 by the stationary cutting blade 93.

As shown in FIGS. 1 and 3, the first and second rotary disk cutters 94 and 99 are mounted upon and supported by an adjustable cutting frame 106 which attaches to the bottom of the stationary support shaft 37, beneath the lower rotary platform 41. Thus, the orientation, height and distance of the cutting blades 96 and 101 from the birds can be easily adjusted by adjusting the cutting frame 106 to accommodate birds of different sizes.

Operation

In operation of the breast removal apparatus 30 (FIG. 1), a bird 10 is carried by an overhead conveyor system 12 hanging downwardly by its legs 13. As the bird proceeds in the direction of Arrow A, it is carried into engagement with the pair of parallel guide rods 34. The guide rods 34 stabilize the bird and prevent it from swinging from side to side and tend to urge the bird toward the cam drum 38. The guide rods 34 orient the bird, as the bird moves along the guide rods so that the visceral opening 26 of the bird is in position to be engaged by the mandrel 61.

The mandrel 61 is initially positioned adjacent the upper edge 47 of the cam drum 38 in a non-engaging position as shown at 107. At the same time the bird 10 enters the breast removal apparatus, the carriage 54 (FIG. 3) on which the mandrel 61 is supported is moved with the rotation of the upper and lower rotary platforms 39 and 41 about the cam drum 38. The carriage 54 begins to move downwardly as the cam roller 58 of the carriage rolls along cam track 49. As the carriage 54 moves downwardly along the length of the vertical guide bars 44, it carries the mandrel 61 downwardly toward and into engagement with the visceral opening 26 (FIGS. 1 and 5) of the bird 10.

As the mandrel 61 enters the bird 10, the vertical slot 72 (FIG. 4C) formed in the rear surface 66 of the mandrel rides along the backbone of the bird. The projection 71 (FIGS. 4A and 4B) at the front of the mandrel engages the rib cage of the bird, filling the breast cavity of the bird. The filling of the breast cavity causes the breast 17 (FIG. 5) of the bird to swell and protrude outwardly. The mandrel 61 moves downwardly until it is completely inserted into the visceral cavity 24 of the bird and rigidly supports the bird during the cutting function.

The L-shaped support arm 59 (FIG. 3) of the carriage 54 engages the contact plate 89 (FIG. 6) of the tiltable holding plate 76 as the mandrel 61 (FIG. 5) is lowered and becomes completely inserted within the visceral cavity of the bird. The L-shaped support arm 59 pushes the contact plate downwardly toward a substantially horizontally orientation, as shown in FIG. 3. As shown in FIG. 5, in response to the downward movement of the contact plate, the front plate 83 of the tiltable holding plate 76 swings upwardly about the axle 82 in the direction of Arrows C toward the neck opening 27 of the bird 10.

The wishbone engagement protrusion 87 of the front plate 83 is thrust into the neck opening 27 of the bird 10, penetrating the neck opening as the neck 18 of the bird 10 is extended through the open space 85 between the arms 88 of the tiltable holding plate 76 in a clamping relationship the slanted front surface 69 of the mandrel 61, holding the wishbone in a fixed position between the protrusion 87 and the front surface 69 of the mandrel 61. At the same time, the curved side portions 86 and arms 88 of the front plate 83 are tilted into contact with the shoulders 19 of the bird as the wishbone engagement protrusion 87 engages the neck opening of the bird. The curved side portions 86 push the shoulders 19 of the bird 10 upwardly and against the mandrel 61. The clamping of the wishbone of the bird 10 between the wishbone engagement protrusion 87 and the slanted front surface 69 of the mandrel 61 and the engagement and support of the shoulders 19 of the bird 10 by the curved side portions 86 of the tiltable holding plate 76 serve to positively grip and stabilize the neck 18 of the bird during the cutting function.

After the bird 10 has been engaged and secured by the mandrel 61 and the tiltable holding plate 76, the bird is carried into engagement with the stationary cutting blade 93 (FIG. 1) at the end of the guide rails 34. The stationary cutting blade cuts into the bird between the saddle 23 and the breast 17 of the bird. This forms a guide incision for the later cutting of the bird by the second rotary disk cutter 99.

Figure 7:
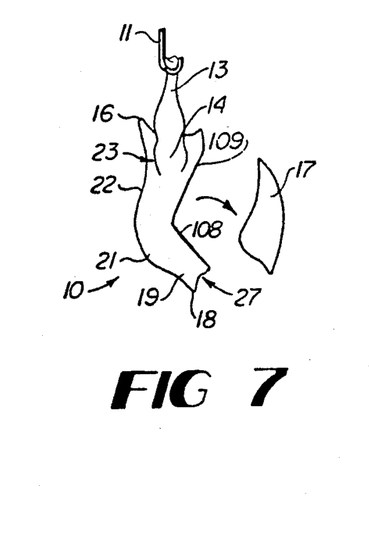
FIG. 7 is a side schematic view of a bird, showing the breast of the bird cut away from the neck, shoulders, back and saddle of the bird.

The bird 10 is carried about the curve 33 in the overhead conveyor system 12 by the rotation of upper and lower rotary platforms 39 and 41 about the cam drum 38 in the direction of Arrow B (FIG. 2). As the bird rotates about the cam drum 38 (FIGS. 1 and 3), it is engaged by the cutting blade 96 of the first rotary disk cutter 94. The cutting blade 96 cuts upwardly into the bird 10 (FIG. 1), between the breast 17 and the neck 18 and shoulders 19 of the bird. As shown by FIG. 7, the cutting blade 96 cuts into the bird along cutting lines indicated at 108. The breast 17 is thus separated from the neck 18, shoulders 19 and upper back 21 of the bird 10 by the first rotary disk cutter 94 (FIG. 1).

As the bird 10 proceeds further around the curve 33 in the overhead conveyor line 12, it is engaged by the second rotary disk cutter 99. The cutting blade 101 cuts downwardly between the saddle 23 and the breast 17 of the bird 10, following through the guide incision made by the stationary cutting blade 93. The cutting blade 101 cuts along cutting lines 109, as shown in FIG. 7, to separate the breast 17 from the saddle 23 and lower back 22 of the bird 10. As shown in FIG. 7, the breast 17 is cut free from the remaining portions of the bird and allowed to fall away into a storage bin (not shown) positioned beneath the breast removal apparatus.

Once the breast 17 (FIG. 1), has been removed from the bird 10, the carriage 54 is guided upwardly by the further movement of the cam roller 58 (FIG. 3) along cam track 49. The carriage 54 raises the mandrel 61 upwardly which tends to pull the bird 10 (FIG. 1) upwardly. The removal bar 73 positioned adjacent the mandrel 61 engages the tail 16 of the bird as the mandrel is raised toward a resting, non-engagement position. As a result, the mandrel 61 is disengaged from the bird which is carried away from the breast removal apparatus 30 for further processing while the mandrel rotates about the cam drum 38 toward engagement with additional birds.

At the same time the bird 10 is being urged off of the mandrel 61, the rod 91 (FIG. 6) protruding from the rear portion of the tiltable holding plate 76 engages and begins to slide upwardly along bar 92 in the direction of Arrow D. As the rod 91 moves upwardly, the tiltable holding plate 76 pivots about the axle 82 as shown by Arrows C. The front portion 83 of the tiltable holding plate is correspondingly tilted downwardly toward a horizontally aligned resting position. Thus, if the tiltable holding plate 76 has become stuck with its front plate 83 in an upwardly tilted engagement position, due to skin, meat or other pieces of the bird being stuck between the axle 82 and the arms 88 or contact plate 89, the front plate 83 is automatically returned to a resting position, ready for engagement with the neck opening of a bird.

It will be understood that the foregoing relates only to a preferred embodiment of the present invention, and numerous changes and modifications may be made thereto without departing from the spirit and scope of the invention as set forth in the following claims.

I claim:

1. A method of removing the breast portion of previously eviscerated birds as the birds are carried along a poultry processing line, comprising the steps of:

moving on a overhead conveyor system a plurality of birds in series along a processing path with the birds suspended by their legs from the overhead conveyor system, the visceral openings of the birds facing upwardly and the neck openings of the birds facing downwardly as the birds move;

moving a mandrel downwardly into the visceral cavity of each bird and expanding the visceral cavity of each bird in response to the downward movement of the mandrel, moving a holding means upwardly toward each mandrel into stabilizing engagement with the neck portion of each bird on each mandrel so as to positively engage the neck portion of each bird between the holding means and its mandrel to stabilize the neck portion of each bird;

while the holding means and mandrels engage the neck portion of each bird, separating the breast from the shoulders and back portion of each bird; and removing the mandrel from each bird and moving the holding means away from each bird.

2. The method of claim 1 and further including the steps of carrying the birds into engagement with a pair of guide rails, and as the birds move along the guide rails, guiding the birds into a position to receive the mandrel within the visceral cavities of the birds.

3. The method of claim 1 and wherein the step of moving a holding means upwardly toward each mandrel into stabilizing engagement with the neck portion of each bird comprises engaging the neck opening of each bird with a protrusion affixed to a tiltable holding plate, gripping with the holding plate the shoulders of each bird and holding with the holding plate each bird in a fixed position against the mandrel during the removal of the breast of each bird.

4. The method of claim 1 and wherein the step of removing the mandrel from each bird comprises raising the mandrel away from the bird toward a raised non-engagement position, and as the mandrel is raised engaging with a removal member the tail portion of each bird and urging with the removal member each bird off of and away from the mandrel.

5. The method of claim 1 and wherein the step of moving a holding means upwardly toward each mandrel into stabilizing engagement with the neck portion of each bird comprises moving the holding means upwardly in response to the downward movement of its mandrel.

6. A method of treating previously eviscerated birds comprising:

moving a plurality of birds suspended by their legs in series on an overhead conveyor system along a processing path, and as each bird moves along the processing path:

moving a mandrel downwardly from above the carcass of each bird into the visceral cavity of each bird and moving a holding means upwardly from below the carcass of each bird into engagement about the neck portion and shoulders of each bird for clamping each bird between the mandrel and the holding means, and while each bird is clamped between the mandrel and the holding means, cutting the carcass of each bird.

7. The method of claim 6 and wherein the step of moving the holding means upwardly from below the carcass of each bird comprises moving a holding plate upwardly into engagement with each bird in response to the downward movement of said mandrel.

8. The method of claim 6 and wherein the step of moving the holding means upwardly from below the carcass of each bird into engagement about the neck portion and shoulders of each bird comprises engaging with the holding means against the wish bone of the carcass.

9. The method of claim 6 and wherein the step of moving a mandrel downwardly from above the carcass of each bird into the visceral cavity of each bird comprises moving a vertical slot in the mandrel about the backbone of each bird.

10. A method of removing the breasts of poultry carcasses as the poultry carcasses are transported in series along a poultry processing line, comprising:

advancing a plurality of poultry carcasses along a poultry processing line toward a cutting station suspended by their legs with the visceral openings of the poultry carcasses facing upwardly and the neck openings of the poultry carcasses facing downwardly;

moving a mandrel downwardly into the visceral cavity of each poultry carcass;

engaging the neck opening of each poultry carcass with a tiltable holding plate to hold each poultry carcass stationary for cutting;

after the poultry carcasses have been stabilized for cutting, precutting into the poultry carcasses between the breasts and saddle of the poultry carcasses to form guide incisions in the poultry carcasses;

cutting upwardly into the poultry carcasses between the breast and neck of each poultry carcass to separate the breast from the neck, shoulders and upper back of each poultry carcass; and cutting downwardly into the carcasses through the guide incision formed between the saddle and breast of each poultry carcass to separate the breast from the saddle and lower back of each poultry carcass to thereby complete the removal of the breast from each poultry carcass.

11. The method of claim 10 and wherein the step of engaging the neck opening of each poultry carcass with a tiltable holding plate comprises pivoting the tiltable holding plate upwardly, inserting a protrusion mounted on the tiltable holding plate into the neck opening of each poultry carcass, engaging the wishbone of each poultry carcass with the protrusion, engaging the shoulders of each poultry carcass with the outwardly sloped side edges of the tiltable support plate and urging the shoulders of each poultry carcass upwardly toward the mandrel to positively grip and hold the neck portion, shoulders and breast of each poultry carcass during cutting.

12. The method of claim 10 and further including the steps of raising the mandrel after the breast has been removed from each poultry carcass, raising each poultry carcass into contact with a removal bar, and urging each poultry carcass off of the mandrel so as to clear the mandrel.

13. The method of claim 12 and further including the steps of after each poultry carcass has been removed from the mandrels, urging the rear portion of the tiltable holding plate upwardly and swinging the front portion of the tiltable holding plate downwardly into a resting position ready to engage the neck opening of a poultry carcass.

14. The method of claim 10 and wherein the step of moving a mandrel downwardly into the visceral cavity of each poultry carcass comprises receiving and holding the backbone of each poultry carcass within a recess formed in the rear surface of the mandrel, and at the same time, pulling the backbone into the recess in the rear surface of the mandrel by engaging the visceral cavity of each carcass with a projection formed at the front of the mandrel.

15. Apparatus for removing the breast from the upper and lower back, saddle, tail, shoulders and neck portion of a bird, comprising:
 a support frame;
 a plurality of removal modules mounted upon said support frame and revolved along a processing path about said support frame for engaging the bird and supporting the bird during cutting;
 a cam track extending around said support frame for guiding said removal modules along said processing path as said removal modules revolve about said support frame;
 a first rotary disk cutter positioned to one side of said support frame and aligned with the movement of the bird along said processing path for engaging the bird between the breast and shoulders of the bird to thereby separate the breast from the shoulders and upper back;
 a second rotary disk cutter positioned along said processing path downstream from said first rotary disk cutter and aligned with the movement of the bird along said processing path, for engaging the bird between the breast and saddle of the bird to thereby separate the breast from the saddle and lower back of the bird, for completing the removal of the breast from the bird; and
 a means for urging the bird away from the removal module mounted adjacent each of said removal modules.

16. The apparatus of claim 15 and wherein said removal modules each comprise a pair of vertically aligned guide bars affixed to said support frame, a carriage slidably mounted upon said guide bars and movable vertically along said guide bars, a cam roller attached to said carriage and in engagement with said cam track for guiding said carriage along said cam track, and a mandrel mounted to said carriage for engaging the visceral cavity of a bird as said carriage moves along said cam track.

17. The apparatus of claim 16 and further including a plurality of tiltable holding plates each mounted below and aligned with a separate mandrel, each of said tiltable holding plates including a front portion having a wishbone engagement protrusion mounted thereon and being pivotable upwardly in response to the movement of each of said mandrels into the visceral cavity of a bird, to penetrate the neck opening of the bird in a clamping relationship with said mandrels for stabilizing the shoulders and upper back of the bird prior to the cutting of the bird by said first rotary disk cutter.

18. The apparatus of claim 15 and wherein said means for urging the bird away from said removal module comprises a vertical rod positioned such that as said cam means moves each of said mandrels upwardly, the tail of the bird on said mandrel engages said vertical rod and is prevented from moving further upwardly as said mandrel moves upwardly, thereby urging the bird off of said mandrel.

19. The apparatus of claim 16 and wherein said mandrels each comprise a substantially rigid block having an outwardly extending front protrusion which engages the inside of the breast as said mandrel is inserted into the visceral cavity of the bird to expand the visceral cavity of the bird, and a vertically aligned slot for receiving the backbone of the bird as said mandrel enters the visceral cavity of the bird.

20. An apparatus for removing breasts from the shoulders, upper backs, lower backs, tails and saddles of birds as a plurality of birds move in equally spaced series on an overhead conveyor system, comprising:
 a support frame;
 a plurality of mandrels mounted on said support frame;
 means for moving said mandrels in series about said support frame in timed relationship with the conveyor system;
 a cam system for moving said mandrels into and out of the visceral cavity of each of the birds in response to said mandrels revolving about said support frame;
 a first rotary disk cutter positioned adjacent said support frame and in the path of the birds and oriented so as to cut into the birds between the breasts and shoulders of the birds to separate the breasts from the shoulders and upper backs of the birds as each bird moves with its mandrel;
 a second rotary disk cutter positioned adjacent said support frame downstream from said first rotary disk cutter and oriented to cut into the birds between the breasts, saddles and lower backs of the birds to separate the breasts from the shoulders and lower backs of the birds; and
 a plurality of removal members each mounted adjacent one of said mandrels for urging the birds off of said mandrels as said cam means moves said mandrels out of the visceral cavity of each bird.

21. The apparatus of claim 20 and further including a stationary cutting blade positioned along the path of movement of the birds for precutting each bird between the breast and saddle of each bird to form a guide incision in each bird.

22. The apparatus of claim 20 and further including a plurality of tiltable holding plates each mounted below and parallel to a separate mandrel, each of said tiltable holding plates being pivotable upwardly in response to the movement of said mandrels into the visceral cavity of each of the birds, for engaging the neck openings of the birds to thereby stabilize the shoulders and upper backs of the birds prior to the cutting of the birds by said first rotary disk cutter.

23. The apparatus of claim 20 and wherein said mandrels each comprise a substantially rigid block having an outwardly extending front protrusion which engages the inside of the breasts of the birds as said mandrel is inserted into the visceral cavities of the birds to thus expand the visceral cavities of the birds, and a vertically aligned rear slot for receiving the backbones of the birds as said mandrel enters the visceral cavities of the birds.

24. The apparatus of claim 20 and wherein said removal members each comprise a vertical rod positioned such that as said cam means moves each of said mandrels upwardly, the tail of the birds on each of said mandrels engages said vertical rod and is prevented from moving further upwardly as each of said mandrels moves upwardly, thereby urging the birds off of each of said mandrels.

* * * * *